(12) United States Patent
Goldsworthy et al.

(10) Patent No.: US 6,565,793 B1
(45) Date of Patent: May 20, 2003

(54) METHOD FOR FABRICATING COMPOSITE PRESSURE VESSELS

(75) Inventors: William B. Goldsworthy, Palos Veredes Estates, CA (US); George J. Korzeniowski, Sherman Oaks, CA (US); Thomas G. Carter, Kent, OH (US)

(73) Assignee: Essef Corporation, Cincinnati, OH (US)

(*) Notice: Subject to any disclaimer, the term of this patent is extended or adjusted under 35 U.S.C. 154(b) by 0 days.

(21) Appl. No.: 09/152,170

(22) Filed: Sep. 11, 1998

(51) Int. Cl.⁷ .......................... B29C 70/44; B29C 70/46
(52) U.S. Cl. .................... 264/516; 264/257; 264/258; 264/314; 156/156; 156/172; 220/589; 220/590
(58) Field of Search .................... 264/516, 313, 264/314, 510, 511, 512, 257, 102; 156/187, 156, 172, 173; 220/4.13, 588, 589, 590

(56) References Cited

U.S. PATENT DOCUMENTS

| | | | |
|---|---|---|---|
| 3,091,000 A | | 5/1963 | Makowski |
| 3,137,898 A | * | 6/1964 | Geringer ..................... 264/314 |
| 3,177,105 A | * | 4/1965 | Wiltshire ..................... 264/314 |
| 3,426,940 A | | 2/1969 | Broerman |
| 3,649,409 A | | 3/1972 | Bell et al. |
| 3,816,578 A | | 6/1974 | Fuller |
| 3,937,781 A | * | 2/1976 | Allen ......................... 264/314 |
| 3,962,393 A | * | 6/1976 | Blad ........................... 264/257 |
| 3,970,495 A | * | 7/1976 | Ashton et al. .............. 156/162 |
| 4,126,659 A | * | 11/1978 | Blad ............................ 264/90 |
| 4,169,749 A | * | 10/1979 | Clark .......................... 156/156 |
| 4,256,231 A | * | 3/1981 | Cioc et al. ..................... 215/1 |
| 4,267,142 A | * | 5/1981 | Lankheet ..................... 264/510 |
| 4,327,052 A | * | 4/1982 | Sauer ........................... 264/512 |
| 4,576,776 A | | 3/1986 | Anderson |
| 4,584,041 A | * | 4/1986 | Lyman et al. ............... 156/156 |
| 4,589,563 A | * | 5/1986 | Born ............................... 220/3 |
| 4,619,374 A | * | 10/1986 | Yavorsky ..................... 220/414 |
| 4,740,262 A | | 4/1988 | Yavorsky et al. |
| 4,876,050 A | * | 10/1989 | Horton ........................ 264/102 |
| 4,940,563 A | | 7/1990 | Kromrey |
| 4,961,977 A | | 10/1990 | Archer et al. |

(List continued on next page.)

FOREIGN PATENT DOCUMENTS

| | | | |
|---|---|---|---|
| DE | 234776 | 5/1911 | |
| DE | 4215756 | 11/1993 | |
| EP | 0635672 | 1/1995 | |
| GB | 859554 | 1/1961 | |
| JP | 53-34870 | * 3/1978 | ................ 264/314 |
| JP | 59-5035 | * 1/1984 | ................ 264/516 |
| WO | WO9851480 | 11/1998 | |

*Primary Examiner*—Stefan Staicovici
(74) *Attorney, Agent, or Firm*—David E. Rogers; Stuart A. Whittington; Squire, Sanders & Dempsey LLP (57) ABSTRACT

A process of fabricating a composite vessel includes the steps of: A) fabricating a thermoplastic liner for the vessel; B) overlaying a layer comprising fiber and a thermoplastic material (preferably by winding commingled filaments, rovings or yarns) onto the thermoplastic liner to obtain a composite intermediate structure (the fiber and thermoplastic material can be heated if desired during the overlaying, e.g. winding, step); C) heating the composite intermediate structure in a mold while applying at least one force thereto tending to urge the composite intermediate structure against and into the shape of the interior walls of the mold; D) continuing step C) until the thermoplastic liner and the overlaid layer consolidate to form a composite vessel; E) cooling the mold and composite vessel until the composite vessel is solidified; and F) removing the formed composite vessel from the mold. The at least one force applied during step C) may be obtained by introducing gas pressure into the interior of the composite intermediate structure. Suitable materials for the thermoplastic material include: polyethylene, polypropylene, polybutylene terephthalate and polyethylene terephthalate. The resulting composite vessel exhibits superior mechanical and aesthetic properties.

25 Claims, 6 Drawing Sheets

U.S. PATENT DOCUMENTS

| | | | |
|---|---|---|---|
| 5,009,941 A | | 4/1991 | Pollet et al. |
| 5,012,950 A | | 5/1991 | Knappe |
| 5,025,943 A | * | 6/1991 | Forsman ..................... 220/589 |
| 5,049,349 A | | 9/1991 | McCullough et al. |
| 5,085,821 A | | 2/1992 | Nohara |
| 5,150,812 A | * | 9/1992 | Adams ....................... 220/414 |
| 5,202,165 A | * | 4/1993 | Lusignea et al. .............. 428/1 |
| 5,208,051 A | * | 5/1993 | Berg et al. .................. 425/393 |
| 5,227,236 A | | 7/1993 | Handermann |
| 5,242,517 A | * | 9/1993 | Endoh ......................... 156/92 |
| H1261 H | | 12/1993 | Gibson et al. |
| 5,287,987 A | * | 2/1994 | Gaiser ........................ 220/589 |
| 5,342,463 A | * | 8/1994 | Addeo et al. ............... 156/156 |
| 5,358,683 A | * | 10/1994 | Rhodes ....................... 264/515 |
| 5,385,262 A | * | 1/1995 | Coquet et al. .............. 220/589 |
| 5,518,141 A | * | 5/1996 | Newhouse et al. ......... 220/586 |
| 5,556,601 A | * | 9/1996 | Huvey et al. ............... 156/172 |
| 5,571,357 A | * | 11/1996 | Darrieux et al. ............ 156/173 |
| 5,575,875 A | | 11/1996 | Brittingham et al. |
| 5,672,309 A | | 9/1997 | Masui et al. |
| 5,763,027 A | * | 6/1998 | Enders et al. .............. 428/34.7 |
| 5,816,436 A | * | 10/1998 | Grosjean et al. ............ 220/590 |
| 5,817,203 A | * | 10/1998 | Moser ........................ 156/155 |
| 5,862,938 A | | 1/1999 | Burkett |
| 5,900,107 A | | 5/1999 | Murphy et al. |

* cited by examiner

METHOD FOR FABRICATING COMPOSITE PRESSURE VESSELS

FIELD OF THE INVENTION

This invention relates to the art of fabricating pressure vessels and, more particularly, to improved methods for fabricating composite pressure vessels and to composite pressure vessels made in accordance with the improved methods.

BACKGROUND OF THE INVENTION

Pressure vessels, such as hot water heaters, boilers, pressurized gas tanks and the like, have traditionally been fabricated from metal such as steel. However, in recent years, the use of composite pressure vessels has become more prevalent. These composite pressure vessels have typically been fabricated by a filament winding process which utilizes thermoset plastic resins such as epoxies, polyesters and vinylesters. Briefly, this technology is the process of impregnating dry fibers, such as fiberglass strands, with catalyzed resin prior to application to a mandrel. Preimpregnated fibers ("prepreg") may also be used. The mandrel and applied composite are then cured, at ambient temperature or with heat, to set-up the laminate and obtain a hard resin and fiber laminate shell. This shell is either removed from the mandrel or the mandrel itself becomes part of the finished product. Although the specific product application determines the exact function of the resin, in all cases, in all cases it serves as the support structure for keeping the continuous fiber strands in position.

The thermoset resins used in these processes can be categorized as of the low temperature commodity type which are characterized by their relative ease of use, low cost and availability. These resins have long served to meet the performance requirements of a wide range of pressure vessel products. However, these resin systems have well known drawbacks which may include their limited temperature capabilities, unsatisfactory finished product aesthetics, lack of extended durability, lack of appropriateness for recycling and manufacturing related issues such as downtime due to clean-up and material handling costs. Further, there are environmental concerns arising from worker exposure to vapor, overspray, emissions, etc. encountered during the fabrication processes. Some engineered thermoset resins improve performance through higher temperature capability, but unacceptable material costs are associated with them.

In addition, because of the materials and processes employed, composite pressure vessels prepared according to the prior art processes inherently have residual and significant internal stresses which, along with certain temperature sensitive incompatibilities of the materials, limit the pressure and temperature ranges in which the pressure vessels find use.

Thus, increasing performance demands, environmental issues, manufacturing issues and new market opportunities have emphasized the limitations of the use of thermoset resins in the manufacture of composite pressure vessels. Composite pressure vessels with higher temperature and pressure capabilities, improved appearance and greater durability and impact resistant characteristics and which, as to fabrication, are more environmentally-friendly, more cost effective and present fewer manufacturing issues, are accordingly highly desirable.

Therefore, it will be recognized by those skilled in the art that a process for fabricating composite pressure vessels which achieves improvement in all these areas requires a fundamentally different philosophy. It is to the provision of such a fundamentally improved process, and to pressure vessels made by such process that the present invention is directed and by which the following characteristics are obtained: improved contact at higher temperatures between the fiber and resin, better control over reinforcement/matrix ratio, scrap materials which can be effectively recycled, diminished regulation issues caused by emissions, higher processing speeds for the winding (or other overlaying mode) and curing steps, potential labor savings due to less material handling, floor space reduction, adaptability to automation, a safer environment for employees, simplification of processing lines and of material storage and handling, faster changeover times, faster startups, lower training costs, lower energy costs, etc. Therefore, pressure vessels fabricated according to the process are substantially stress relieved and exhibit improved performance over the prior art pressure vessels in that, inter alia, they can withstand higher pressures and temperatures, are more impact resistant and also have a significantly better finish.

OBJECTS OF THE INVENTION

It is therefore a broad object of this invention to provide an improved process for fabricating a composite pressure vessel.

It is more particular an object of this invention to provide such an improved process which enjoys advantages including, as opposed to prior art processes of fabricating composite pressure vessels: better control over reinforcement/matrix ratio, scrap materials which can be effectively recycled, diminished regulation issues caused by emissions, higher processing speeds for the winding (or alternatives to winding) and curing steps, substantial labor savings due to less material handling, floor space reduction, susceptibility to automation, a safer environment for employees, simplification of processing lines and of material storage and handling faster changeover times, faster startups, lower training costs, lower energy costs, etc.

In another aspect, it is an object of this invention to provide a process for fabricating composite pressure vessels which, in use, enjoys long term performance at least as good as that of traditional pressure vessels.

In yet another aspect, it is an object of this invention to provide high quality composite pressure vessels fabricated according to new processes.

In still yet another aspect, it is an object of this invention to provide high quality composite pressure vessels which have improved durability, impact resistance and corrosion resistance as well as higher temperature and pressure handling characteristics and which also have good machinability attributes and can therefore readily be welded, cut, drilled, threaded, stamped or the like as may be desired to produce a high quality finished product.

SUMMARY OF THE INVENTION

Briefly, these and other objects of the invention are achieved by a process of fabricating a composite vessel which includes the steps of: A) fabricating a thermoplastic liner for the vessel; B) overlaying a layer comprising fiber and a thermoplastic material (preferably by winding commingled filaments, rovings or yarns) onto the thermoplastic liner to obtain a composite intermediate structure (the fiber and thermoplastic material can be heated if desired during the overlaying, e.g. winding, step); C) heating the composite intermediate structure in a mold while applying at least one force thereto tending to urge the composite intermediate structure against and into the shape of the interior walls of the mold; D) continuing step C) until the thermoplastic liner and the overlaid layer consolidate to form a composite vessel; E) cooling the mold and composite vessel until the composite vessel is solidified; and F) removing the formed composite vessel from the mold. The at least one force applied during step C) may be obtained by introducing gas pressure into the interior of the composite intermediate structure. Suitable materials for the thermoplastic material include: polyethylene, polypropylene, polybutylene terephthalate and polyethylene terephthalate.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
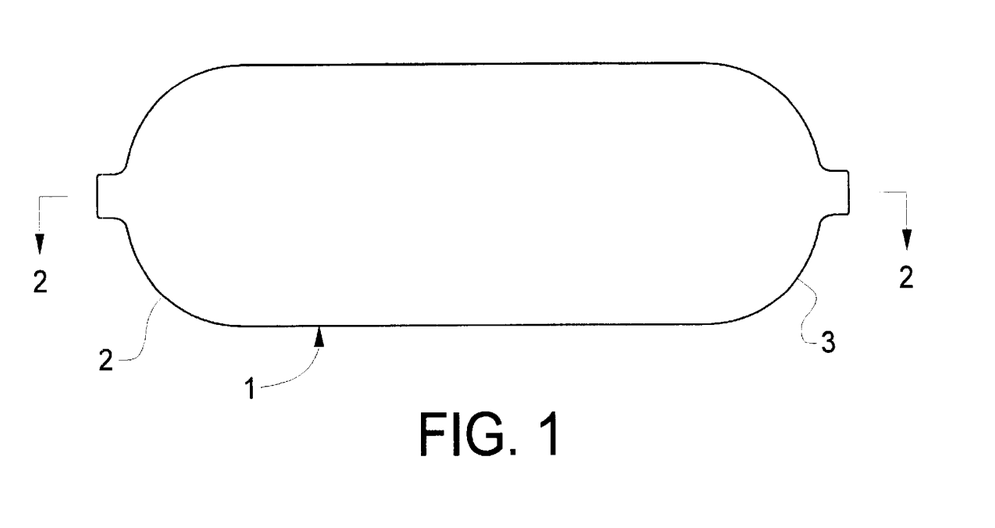
FIG. 1 is a pictorial view of a liner/mandrel employed in practicing a first inventive embodiment.
Figure 2:
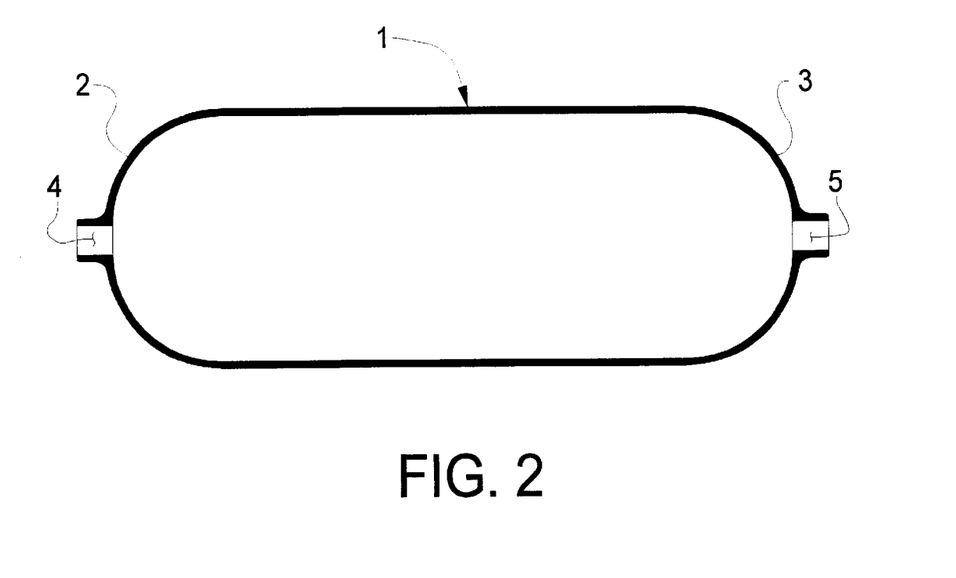
FIG. 2 is a cross sectional view taken along the lines 2—2 of FIG. 1.

Referring first to FIGS. 1 and 2, there is shown a thermoplastic liner/mandrel 1 for a composite pressure vessel to be fabricated according to a first inventive embodiment. In the exemplary embodiment, the liner/mandrel 1 is a generally elongated preformed structure terminating at each end in a dome shape 2, 3 having a central, axial opening 4, 5. Thermoplastic liner 1 may, for example, be made of polypropylene, polyethylene, polybutylene terephthalate, polyethylene terephthalate or fiber (e.g., fiberglass) impregnated polypropylene, polyethylene, polybutylene terephthalate or polyethylene terephthalate or another thermoplastic material with appropriate characteristics and can be prepared by any suitable conventional process such as molding a combination of chopped fiber, directional, woven and/or knitted fiber fabric sewn or welded together in the shape of the vessel and commingled with thermoplastic material.

Figure 3:
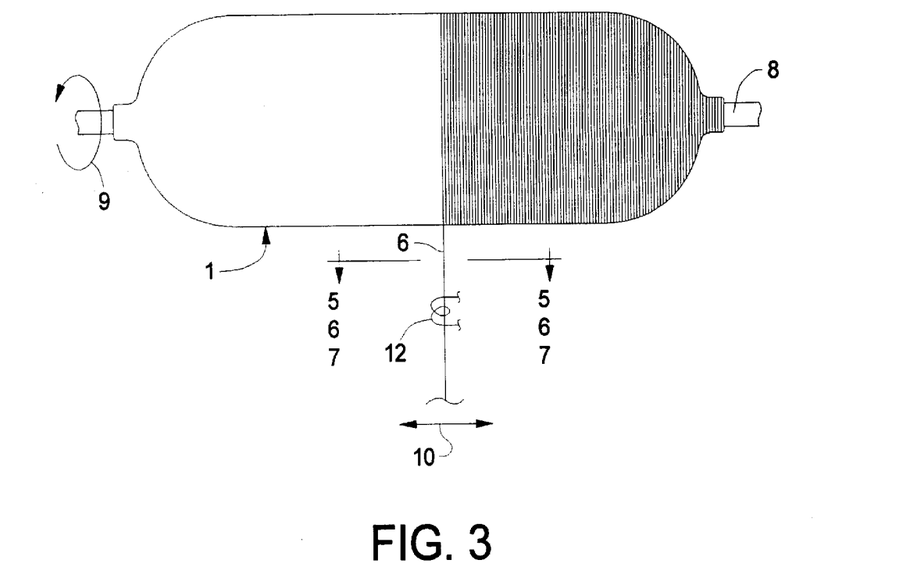
FIG. 3 is a pictorial view of the liner/mandrel shown in FIGS. 1 and 2 being overlaid with a layer of a commingled thermoplastic fiber material.
Figure 4:
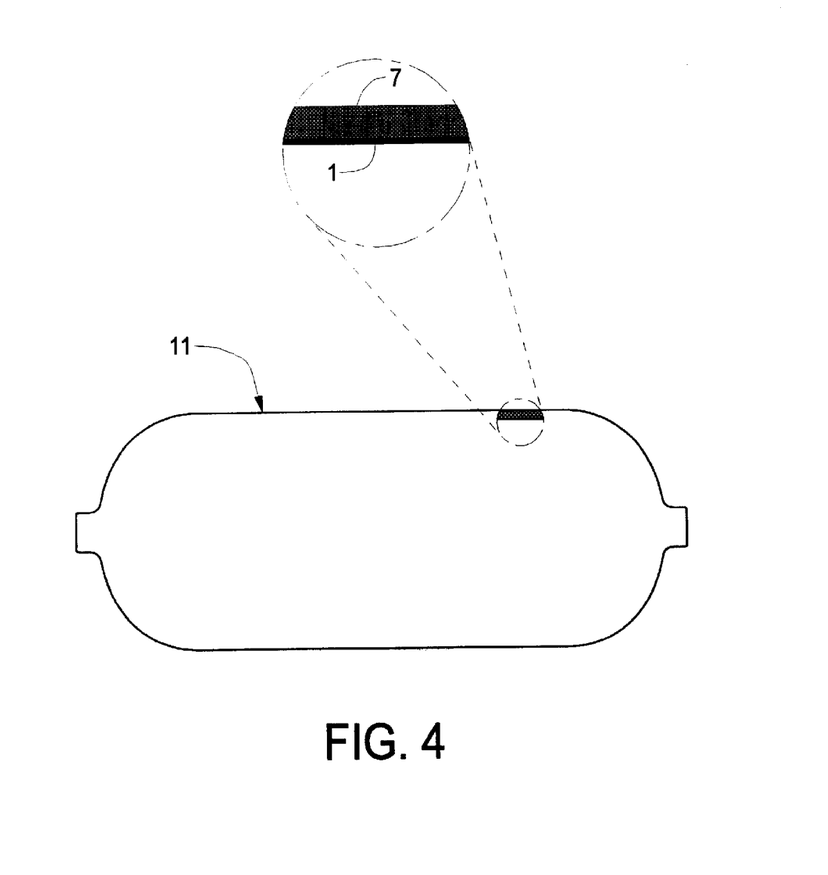
FIG. 4 is a view of the liner after being overlaid with the layer of commingled thermoplastic fiber material and includes an enlarged fragmentary cross sectional view.

As shown in FIG. 3, a filament, roving, yarn or tape 6 of fiber (e.g., fiberglass, carbon fiber, boron fiber, etc.) and a thermoplastic material is methodically wound onto the outer surface of the thermoplastic liner 1 to form a substantially uniform overlay 7 as shown in the enlarged partial cross section in FIG. 4. This step may be carried out, for example, by mounting the thermoplastic liner 1 onto a mandrel 8 and rotating the liner as indicated by the arrow 9 while methodically feeding the filament(s), roving, yarn or tape 6 from a laterally and reciprocally traversing source as represented by the double arrow 10 and continuing this procedure until the overlay 7 has reached the desired thickness. The material 6 may be wound "cold" onto the thermoplastic liner 1 or may be passed through a heater 12 which, in some applications, results in a more uniform overlay 7 (FIG. 4) with better functional and/or aesthetic characteristics. The resulting structure 11 is then processed further as will be described in detail below.

It has been found to be desirable to suitably vary the feed rate in the regions of the domes and end pieces so that a substantially uniform thickness of the overlay throughout the length of the liner 1 is obtained. Alternative winding techniques for achieving a satisfactorily uniform overlay are well known in the prior art, and reference may be taken, for example, to U.S. Pat. No. 3,282,757 entitled METHOD OF MAKING A FILAMENT REINFORCD PRESSURE VESSEL by Richard C. Brussee, incorporated by reference herein and disclosing various winding techniques which may be employed in the practice of the present invention.

Figure 5A:
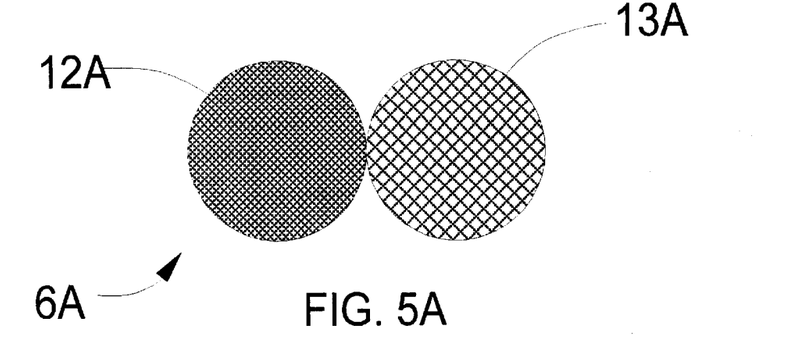
FIGS. 5A, 5B and 5C are cross sectional views taken along the lines 5—5 of FIG. 3 illustrating three variants of a first type of material which can be wound onto the thermoplastic liner to effect the overlayer.

However, the form, and especially the type, of the fiber and thermoplastic material 6 is of significant importance to the practice of the invention such that attention is briefly directed to FIGS. 5A, 5B, 5C, 6A, 6B and 7 which illustrate suitable variants of the material 6 which may be employed in the practice of the invention. In FIG. 5A, separate strands of thermoplastic material 13A and fiber 12A are wound together or separately, but more or less contiguously, as indicated at 6A, onto the liner/mandrel 1. Suitable types of thermoplastic material 13A which may be used in the practice of the invention for this purpose include, but are not limited to, polyethylene, polypropylene, polybutylene terephthalate and polyethylene terephthalate.

Figure 5B:
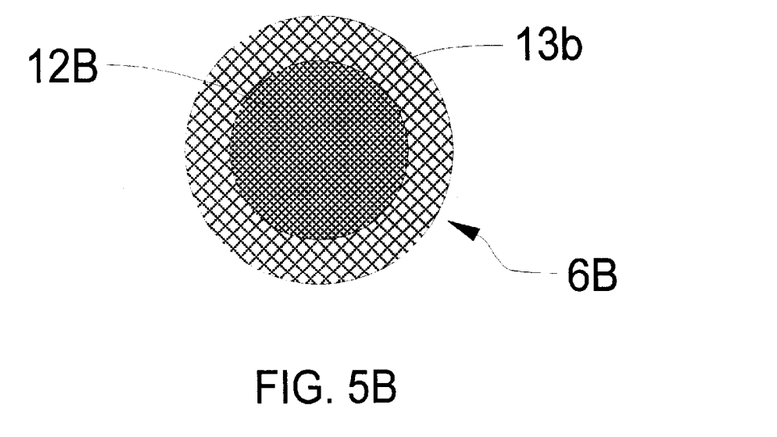
Figure 5C:
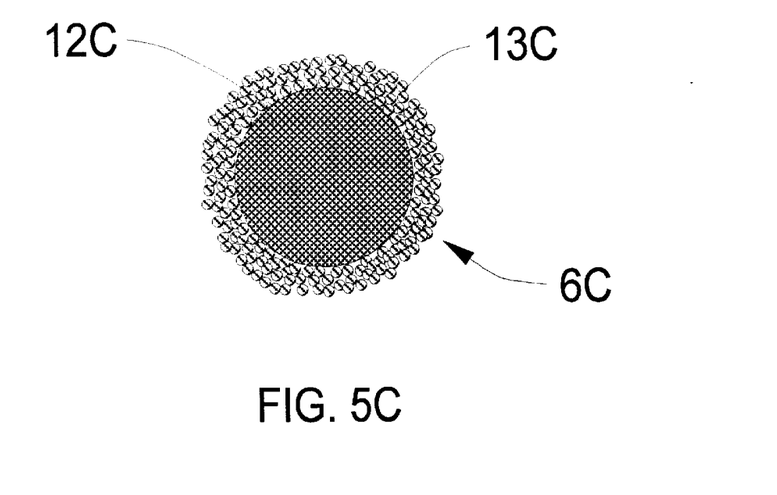

FIG. 5B shows a cross section of a second variant 6B for the material 6 in which the fiber filament 12B is coated with the thermoplastic material 13B by, for example, double extrusion or by any other suitable preliminary process. Similarly, FIG. 5C shows a cross section of a third variant 6B for the material 6 in which the fiber filament 12C is coated with a powder of the thermoplastic material 13C.

Figure 6A:
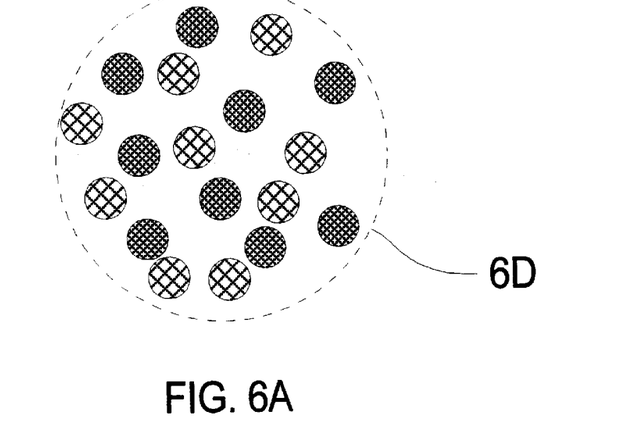
FIG. 6 is a cross sectional view taken along the lines 6—6 of FIG. 3 illustrating a second type of material, a roving of any one of the three variants illustrated in FIGS. 5A, 5B and 5C, which can be wound onto the thermoplastic liner to effect the overlayer.
Figure 6B:
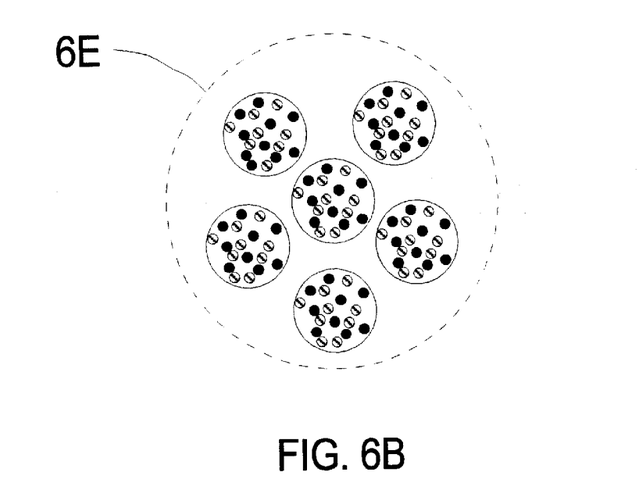
Figure 7:
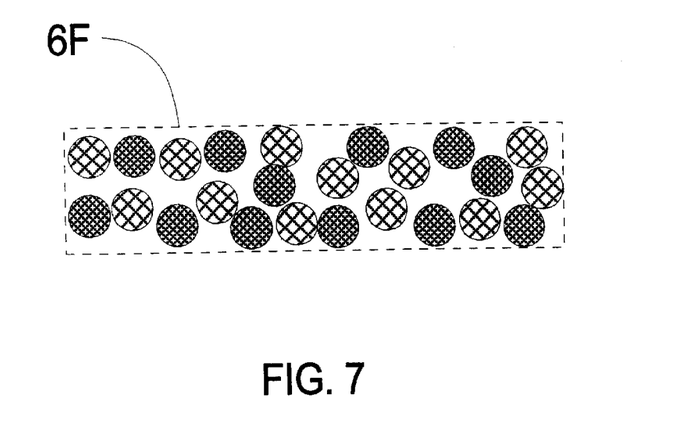
FIG. 7 is a cross sectional view taken along the lines 18—18 of FIG. 3 illustrating a third type of material, a yarn of the second type of material, which can be wound onto the thermoplastic liner to effect the overlayer.

Preferably, however, the fiber 12 and thermoplastic material 13 (in any of the forms shown in FIGS. 5A, 5B, 5C), before winding onto the liner/mandrel 1, are first commingled into a roving 6D as shown in FIG. 6A or into a yarn 6E of such rovings as shown in FIG. 6B. Another preferred configuration for the material 6 is shown in FIG. 7 a s a tape 6F of commingled fiber and thermoplastic material. Suitable rovings, yarns and tapes of commingled fiber, e.g., fiberglass, and thermoplastic material are commercially available, and one product family which has been found to be well suited for use in the present invention is distributed under the trademark Twintex® by Vetrotex. Twintex is prepared by a proprietary process which involves commingling filaments of fiberglass (e.g., 17 micrometers in diameter) with filaments (e.g., 20 micrometers in diameter) of thermoplastic (e.g., polyethylene or polypropylene) during the continuous production of rovings, yarns and tapes which are available as such and also in the form of fabrics.

Thus, merely by way of example, the thermoplastic liner/mandrel 1 may, itself, be fabricated from Twintex® fabric which is sewn or welded together and suitably heat treated, for example, in a mold, to obtain the preform which is subsequently wound with the fiber and thermoplastic material 6 to obtain the intermediate structure 11.

Figure 8:
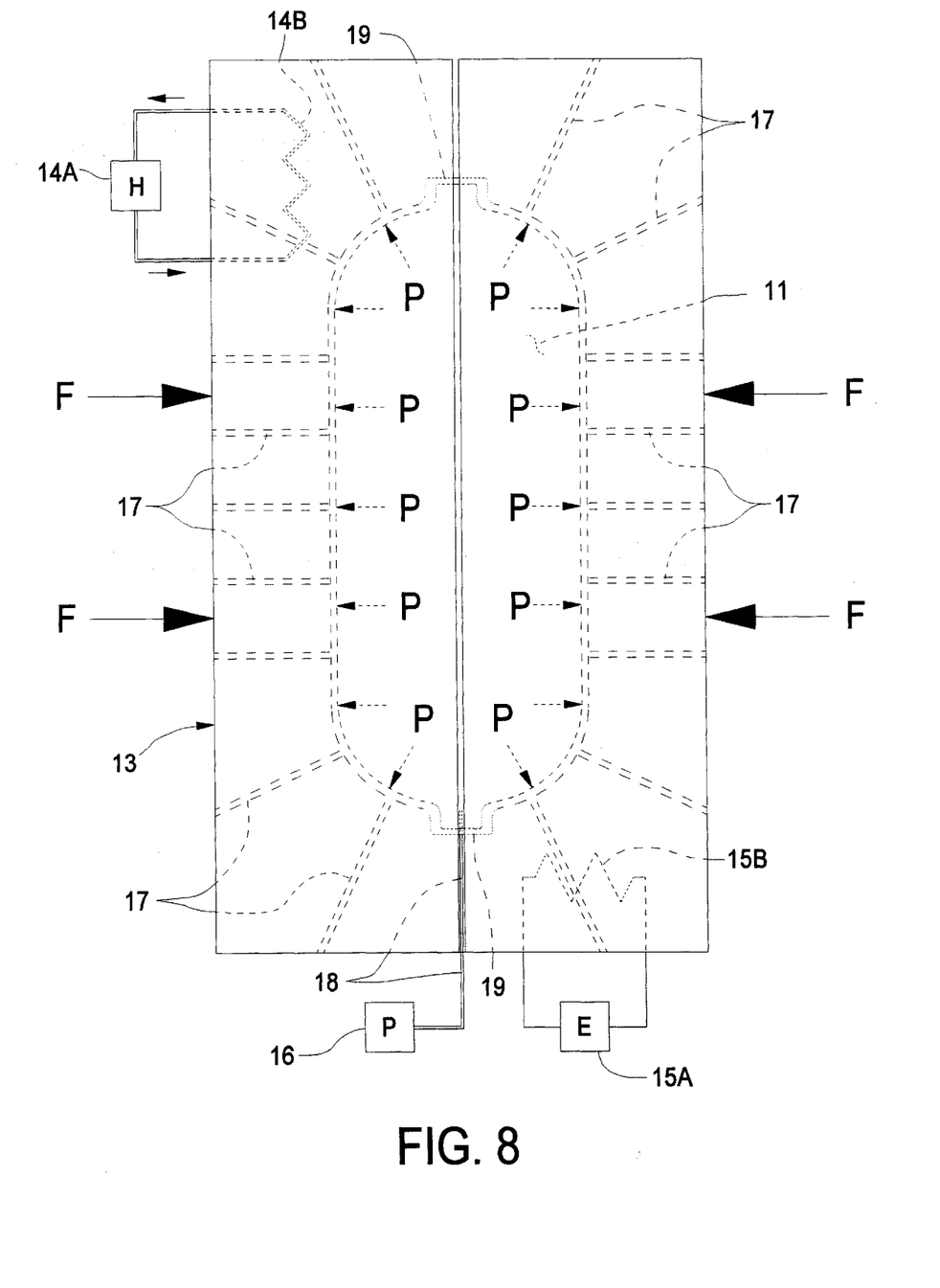
FIG. 8 is a phantom view of a mold showing the modified liner enclosed in a mold in which it is subjected to heat and at least one force tending to urge the modified liner into the shape defined by the inner surface of the mold.
Figure 9:
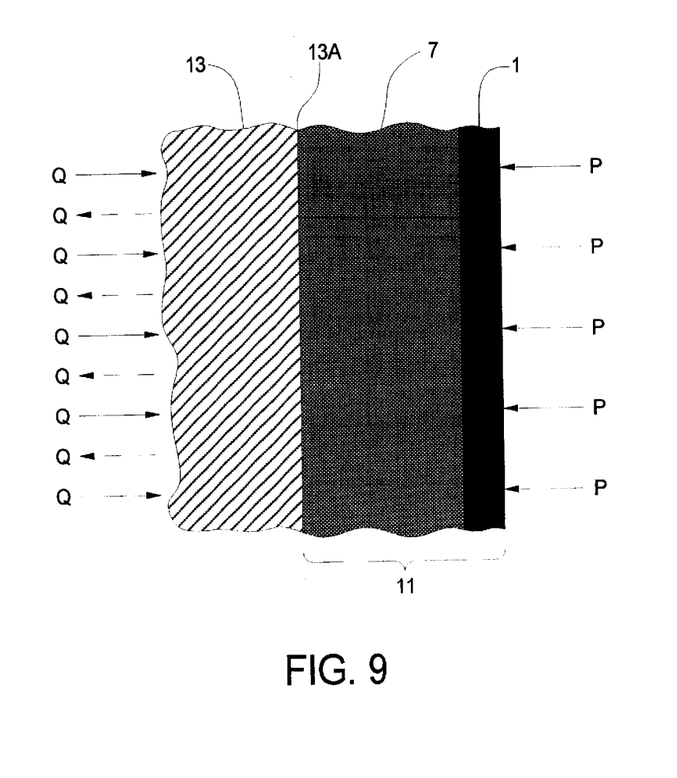
FIG. 9 is an enlarged partial cross sectional view of the modified liner illustrating the effects of the heat and force thereon.

Referring now to FIG. 8, after the intermediate structure 11 has been prepared as described or in any suitable manner, it is placed in a mold 13 (two-piece in the example). The mold is then heated, for example, by embedded resistance heaters represented by the heater 15B controllably driven from a source E 15A and/or by circulating hot oil, heated by a source H 14A, through coils 14B and/or any other suitable conventional mold-heating expedient. In addition, at least one force is applied to the mold 13 and/or the interior of the intermediate structure 11 which tends to cause the exterior surface of the intermediate structure to conform to the inner surface 13A (FIG. 9) of the mold when the applied heat Q causes the thermoplastic liner 1 and the wound overlay 7 to fuse together and flow against the mold. The force or forces may be generated by applying external compression to the mold halves so as to urge them together as indicated by the arrows designated "F" and/or by pressurizing the interior of the thermoplastic liner 1 by, for example, using gas pressure from a suitable source 16 conveyed into the liner 1 through a conduit 18. If pressurization is employed, caps (threaded or permanent) 19 serve to seal the ends of the intermediate structure 11.

The heat is then removed from the mold 13 allowing the now formed composite pressure vessel to harden and to be removed by opening the mold in the conventional manner.

In practice, two important optional considerations may be taken into account. First, it has been found that the mold should be vented, as represented by the peripherally distributed vents 17 shown in FIG. 8, to allow the trapped air to escape as the pressure vessel forms against the inner wall of the mold and thus achieve a particularly fine finish to the outer surface of the pressure vessel which requires little, if any, further surface finish. Second, in order to be assured of complete fusion between the thermoplastic liner 1 and the wound overlay 7, it has been found preferable to select respective materials with somewhat different melting temperatures for the liner and the overlay. More particularly, the best results are obtained if the heating rate is controlled and the melting point of the liner is selected to be above that of the overlay in order that the thermoplastic material effectively melts around the fiber while the liner is softened, but not fully melted during the molding process. For example, as well known in the art, the melting point range of polypropylene is 300° F. to 330° F. while that of polyethylene is 120° F. to 140° F.

Figure 10:
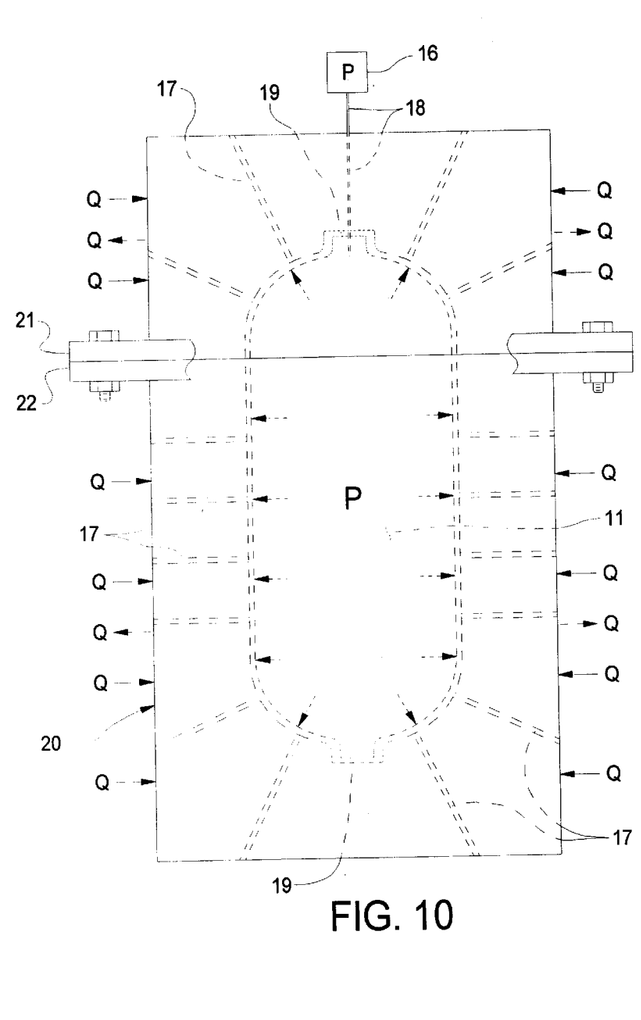
FIG. 10 is a view similar to FIG. 8 showing the modified liner enclosed in a different type of mold.

As shown in FIG. 10, the composite pressure vessel can be fabricated according to a similar process in which a two-piece mold 20, provided with mating flanges 21, 22 which bolt together, is used, thus fully defining a predetermined three dimensional shape for the interior surface of the assembled mold. In this configuration, the intermediate structure 11 is placed into the mold which is assembled. Then, heat Q is applied as described above while the interior of the intermediate structure is pressurized to form the composite pressure vessel. In this variant, there is no need to apply external compressive forces to the mold. Preferably, vents 17 are provided for the reasons noted above.

Composite pressure vessels fabricated in accordance with all the processes disclosed above have performance and aesthetic characteristics significantly improved over those fabricated with the prior art processes. More particularly, they can withstand higher pressures and temperatures, are more impact resistant and exhibit a significantly better finish. They also have good machinability attributes and can therefore readily be welded, cut, drilled, threaded, stamped or the like as may be desired to produce a high quality finished product.

Thus, while the principles of the invention have now been made clear in illustrative embodiments, there will be immediately obvious to the those skilled in the art many modifications of structure and components used in the practice of the invention which are particularly adapted for specific environments and operating requirements without departing from those principles.

What is claimed is:

1. The process for making a composite vessel comprising the steps of:
    A) fabricating a thermoplastic liner for the vessel;
    B) overlaying onto the thermoplastic liner a layer comprising fiber and a thermoplastic material to obtain a composite intermediate structure;
    C) heating the composite intermediate structure in a mold while applying at least one force thereto tending to urge the composite intermediate structure against and into the shape of the interior walls of the mold;
    D) continuing step C) until the thermoplastic liner and the overlaid layer consolidate to form a composite vessel;
    E) cooling the mold and composite vessel until the composite vessel is solidified; and
    F) removing the formed composite vessel from the mold.

2. The process of claim 1 in which, during step B), the fiber and thermoplastic material are wound onto the thermoplastic liner to obtain the composite intermediate structure.

3. The process of claim 2 in which the fiber and thermoplastic material wound onto the thermoplastic liner are commingled.

4. The process of claim 3 in which the fiber and thermoplastic material wound onto the thermoplastic liner constitute a roving.

5. The process of claim 4 in which the fiber and thermoplastic material wound onto the thermoplastic liner constitute a yarn of rovings.

6. The process of claim 1 in which the fiber and thermoplastic material is heated as it is wound onto the thermoplastic liner.

7. The process of claim 2 in which the fiber and thermoplastic material is heated as it is wound onto the thermoplastic liner.

8. The process of claim 3 in which the fiber and thermoplastic material is heated as it is wound onto the thermoplastic liner.

9. The process of claim 4 in which the roving is heated as it is wound onto the thermoplastic liner.

10. The process of claim 5 in which the yarn is heated as it is wound onto the thermoplastic liner.

11. A process for making a composite vessel comprising the steps of:

A) fabricating a thermoplastic liner for the vessel;

B) winding onto the thermoplastic liner a layer comprising fiber and a thermoplastic material, which thermoplastic material is selected to have a melting point lower than that of the thermoplastic liner, to obtain a composite intermediate structure;

C) preheating the composite intermediate structure;

D) heating the composite intermediate structure in a mold while applying at least one force thereto tending to urge the composite intermediate structure against and into the shape of the interior walls of the mold;

E) continuing step D) until the thermoplastic liner and the overlaid layer consolidate to form a composite vessel;

F) cooling the mold and composite vessel until the composite vessel is solidified; and G) removing the formed composite vessel from the mold.

12. A process for making a composite vessel comprising the steps of:

A) fabricating a thermoplastic liner for the vessel;

B) winding onto the thermoplastic liner a layer comprising fiber and a thermoplastic material, which thermoplastic material is selected from among the group comprising polyethylene, polypropylene, polybutylene terephthalate and polyethylene terephthalate, to obtain a composite intermediate structure;

C) heating the composite intermediate structure in a mold while applying at least one force thereto tending to urge the composite intermediate structure against and into the shape of the interior walls of the mold;

D) continuing step C) until the thermoplastic liner and the overlaid layer consolidate to form a composite vessel;

E) cooling the mold and composite vessel until the composite vessel is solidified; and G) removing the formed composite vessel from the mold.

13. The process of claim 1 in which the at least one force applied during step C) is obtained by introducing gas pressure into the interior of the composite intermediate structure.

14. The process of claim 2 in which the at least one force applied during step C) is obtained by introducing gas pressure into the interior of the composite intermediate structure.

15. The process of claim 3 in which the at least one force applied during step C) is obtained by introducing gas pressure into the interior of the composite intermediate structure.

16. The process of claim 4 in which the at least one force applied during step C) is obtained by introducing gas pressure into the interior of the composite intermediate structure.

17. The process of claim 5 in which the at least one force applied during step C) is obtained by introducing gas pressure into the interior of the composite intermediate structure.

18. The process of claim 6 in which the at least one force applied during step C) is obtained by introducing gas pressure into the interior of the composite intermediate structure.

19. The process of claim 7 in which the at least one force applied during step C) is obtained by introducing gas pressure into the interior of the composite intermediate structure.

20. The process of claim 8 in which the at least one force applied during step C) is obtained by introducing gas pressure into the interior of the composite intermediate structure.

21. The process of claim 8 in which the composite intermediate structure is preheated prior to step C) and the at least one force applied during step C) is obtained by introducing gas pressure into the interior of the composite intermediate structure.

22. The process of claim 1 in which the thermoplastic material is selected from among the group consisting of: polyethylene, polypropylene, polybutylene terephthalate and polyethylene terephthalate and in which the composite intermediate structure is preheated prior to step C).

23. The process of claim 3 in which the thermoplastic material is selected from among the group consisting of: polyethylene, polypropylene, polybutylene terephthalate and polyethylene terephthalate and in which the composite intermediate structure is preheated prior to step C).

24. The process of claim 4 in which the thermoplastic material is selected from among the group consisting of: polyethylene, polypropylene, polybutylene terephthalate and polyethylene terephthalate and in which the composite intermediate structure is preheated prior to step C).

25. The process of claim 5 in which the thermoplastic material is selected from among the group consisting of: polyethylene, polypropylene, polybutylene terephthalate and polyethylene terephthalate and in which the composite intermediate structure is preheated prior to step C).

\* \* \* \* \*